(12) United States Patent
Yoshioka

(10) Patent No.: US 7,707,417 B2
(45) Date of Patent: Apr. 27, 2010

(54) SECURE TRANSMISSION OF DATA BETWEEN CLIENTS OVER COMMUNICATIONS NETWORK

(76) Inventor: Masami Yoshioka, 4671 Albany Cir., 109, San Jose, CA (US) 95129

( * ) Notice: Subject to any disclaimer, the term of this patent is extended or adjusted under 35 U.S.C. 154(b) by 756 days.

(21) Appl. No.: 11/166,524

(22) Filed: Jun. 23, 2005

(65) Prior Publication Data

US 2006/0294367 A1     Dec. 28, 2006

(51) Int. Cl.
*H04L 9/32* (2006.01)
*H04L 29/06* (2006.01)

(52) U.S. Cl. .................... 713/169; 713/156; 713/170; 713/175

(58) Field of Classification Search .................. 726/11, 726/12, 13; 713/156, 169, 170, 175
See application file for complete search history.

(56) References Cited

U.S. PATENT DOCUMENTS

| | | | | |
|---|---|---|---|---|
| 5,499,297 | A | 3/1996 | Boebert | 380/23 |
| 5,870,477 | A | 2/1999 | Sasaki et al. | 380/25 |
| 5,894,547 | A * | 4/1999 | Baskey | 714/12 |
| 6,085,324 | A | 7/2000 | Ogram | 713/202 |
| 6,092,196 | A | 7/2000 | Reiche | 713/200 |
| 6,226,687 | B1 * | 5/2001 | Harriman et al. | 709/246 |
| 6,263,446 | B1 | 7/2001 | Kausik et al. | 713/201 |
| 6,351,813 | B1 | 2/2002 | Mooney et al. | 713/185 |
| 6,412,007 | B1 * | 6/2002 | Bui et al. | 709/227 |
| 6,499,107 | B1 | 12/2002 | Gleichauf et al. | 713/201 |
| 6,732,277 | B1 | 5/2004 | Vandergeest et al. | 713/201 |
| 6,754,214 | B1 | 6/2004 | Mahalingaiah | 370/392 |
| 6,760,752 | B1 * | 7/2004 | Liu et al. | 709/206 |
| 6,760,844 | B1 | 7/2004 | McCarthy et al. | 713/201 |
| 6,792,546 | B1 | 9/2004 | Shanklin et al. | 713/201 |
| 6,804,778 | B1 * | 10/2004 | Levi et al. | 713/176 |
| 6,816,973 | B1 | 11/2004 | Gleichauf et al. | 713/201 |
| 7,320,143 | B2 * | 1/2008 | Le Pennec et al. | 726/30 |
| 2003/0002676 | A1 * | 1/2003 | Stachura et al. | 380/260 |
| 2004/0025057 | A1 | 2/2004 | Cook | |
| 2004/0059909 | A1 | 3/2004 | Le Pennec et al. | |

FOREIGN PATENT DOCUMENTS

EP    0588519 A2    3/1994

OTHER PUBLICATIONS

International Search Report, International Application No. PCT/US2006/023838, date mailed Nov. 6, 2006.
Citrix Online, "Go To My PC Security", 1997-2004, pp. 1-10.
Raritan Computer Inc., "The Secure Console", 2004, pp. 1-7.
Citrix Online, "Go to Meeting," pp. 1-11, 2004.

* cited by examiner

*Primary Examiner*—Eleni A Shiferaw
(74) *Attorney, Agent, or Firm*—Beyer Law Group LLP

(57) ABSTRACT

A method and apparatus securely transmit data between a client and a server over a communications network. The secure data transmission includes, after the client is initially authenticated, (a) transmitting a series of client connection messages from the client to the server at least while the data is being transmitted, (b) transmitting a series of server connection messages from the server to the client at least while the data is being transmitted; (c) monitoring the client connection messages at the server; (d) monitoring the server connection messages at the client; (e) if a disturbance is found either in the client connection messages or the server connection messages, terminating the data transmission between the client and the server, re-authenticating the client, and re-transmitting the data; and (f) if the encrypted data is successfully transmitted to the server, storing the data in a database associated with the recipient.

53 Claims, 8 Drawing Sheets

Communication Path
(Data Transmission)

SECURE TRANSMISSION OF DATA BETWEEN CLIENTS OVER COMMUNICATIONS NETWORK

FIELD OF THE INVENTION

The present invention relates to secure data transmission between client computers (clients) over a communications network. More particularly, the present invention relates to a method and apparatus for securely transmitting and exchanging data between clients via an intermediate server.

BACKGROUND OF THE INVENTION

Secure data exchange over a communications network is one of the most important issues in may businesses and industries. Various encryption methods and key schemes (public and private) have been used to securely transmitting electronic data. For example, an electronic mail exchange system is typically protected by a username and password, and usually offers an encryption function for contents and attachments for outgoing messages. Secure Socket Layer (SSL) protocols are typically used for encrypted communications in data exchange systems. Transport Layer Security (TLS) protocols may also used. An electronic certificate (digital ID) is also used to identify the user in electronic transactions. While data to be transmitted is encrypted and access to a data exchange server is restricted using passwords and certificates, such a conventional data exchange system does not protect the "communications path" during the transmission. For example, once the encrypted data was sent out from a source/sender, the encrypted data in he form of data packets may be hacked or altered before reaching the destination/recipient. After a user is allowed access to a data exchange server and starts downloading or uploading data, the data may be intercepted, eavesdropped, or filtered to hack information contained therein. In addition, in electronic transactions such as on-line shopping and on-line banking, a user is only initially authenticated and authorized (typically using the username and password) to log on to a secured site. During such an electronic transaction, a disguised user may log on to access the secured site, or the user may be led to an unintended site which tries to obtain personal information from the user. However, the conventional system does not provide means to confirm that the user is still the same authenticated user, and that the server is still the same server.

BRIEF DESCRIPTION OF THE INVENTION

A method and apparatus securely transmit data between a client and a server over a communications network. The secure data transmission includes, after the client is initially authenticated, (a) transmitting a series of client connection messages from the client to the server at least while the data is being transmitted, (b) transmitting a series of server connection messages from the server to the client at least while the data is being transmitted; (c) monitoring the client connection messages at the server; (d) monitoring the server connection messages at the client; (e) if a disturbance is found either in the client connection messages or the server connection messages, terminating the data transmission between the client and the server, re-authenticating the client, and re-transmitting the data; and (f) if the encrypted data is successfully transmitted to the server, storing the data in a database associated with the recipient.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
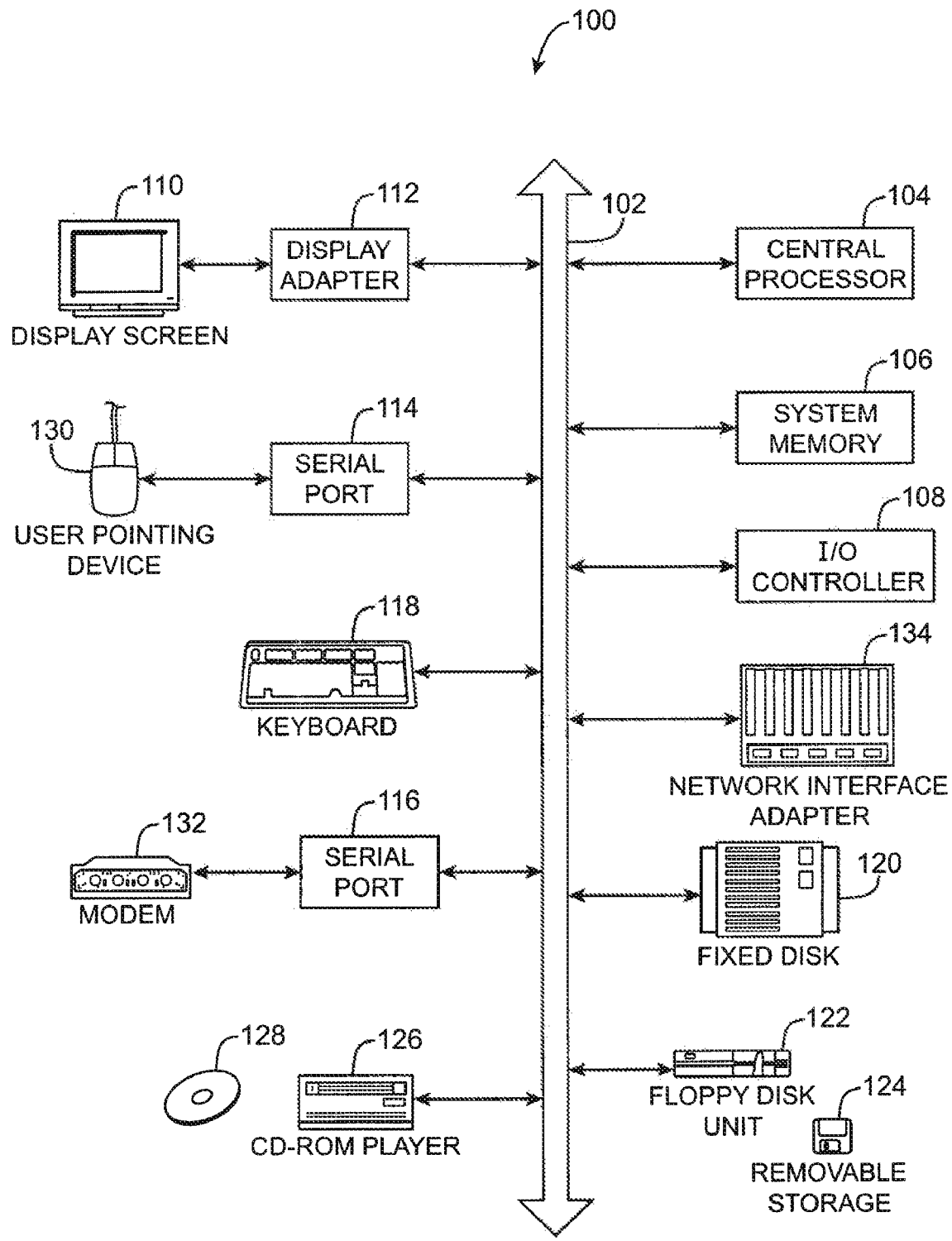
FIG. 1 is a block diagram schematically illustrating a computer system suitable for implementing aspects of the present invention.

Embodiments of the present invention are described herein in the context of a method and apparatus for secure transmission of data between clients over a communications network. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In accordance with one embodiment of the present invention, the method may be implemented on a data processing computer such as a personal computer, workstation computer, mainframe computer, or high performance server running an OS such as Solaris® available from Sun Microsystems, Inc. of Palo Alto, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

FIG. 1 depicts a block diagram of a computer system 100 suitable for implementing aspects of the present invention. As shown in FIG. 1, computer system 100 includes a bus 102 which interconnects major subsystems such as a central processor 104, a system memory 106 (typically RAM), an input/output (I/O) controller 108, an external device such as a display screen 110 via display adapter 112, serial ports 114 and 116, a keyboard 118, a fixed disk drive 120, a floppy disk drive 122 operative to receive a floppy disk 124, and a CD-ROM player 126 operative to receive a CD-ROM 128. Many other devices can be connected, such as a pointing device 130 (e.g., a mouse) connected via serial port 114 and a modem 132 connected via serial port 116. Modem 132 may provide a direct connection to a remote server via a telephone link or to the Internet via a POP (point of presence). Alternatively, a network interface adapter 134 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 1 to be present to practice the present invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion. Code to implement the present invention may be operably disposed in system memory 106 or stored on storage media such as fixed disk 120, floppy disk 124 or optical recording medium 128 such as CD-ROM or DVD-ROM.

As discussed above, although conventional data exchange systems and electronic transaction systems provide ID/password protection and data encryption, the data traffic and transmission paths during communication are still vulnerable to interception, eavesdropping, filtering, and the like. The present invention provides additional layers of security to protect the transmission path by providing an intermediate server between clients (client computers) and exchanging certain connection messages between the client computer and the server. The present invention may also be applied to electronic transactions between a client and a server. In accordance with embodiments of the present invention, a series of connection messages having a specific sequence, order or pattern are and are exchanged as a "background" communication during the data transmission. If any disturbance in the specific sequence, order or pattern is observed at either client side or the server side, the ongoing data transmission is halted, and the process is started over from the initial client-server certification/authentication process. In addition, by sending and receiving the connection messages to and from the client/server, the both sides can continuously confirm each other that they are communicating with the right entity. The present invention also provides a specific certification process in which the client and the server exchange a client certificate and a server certificate.

Figure 2:
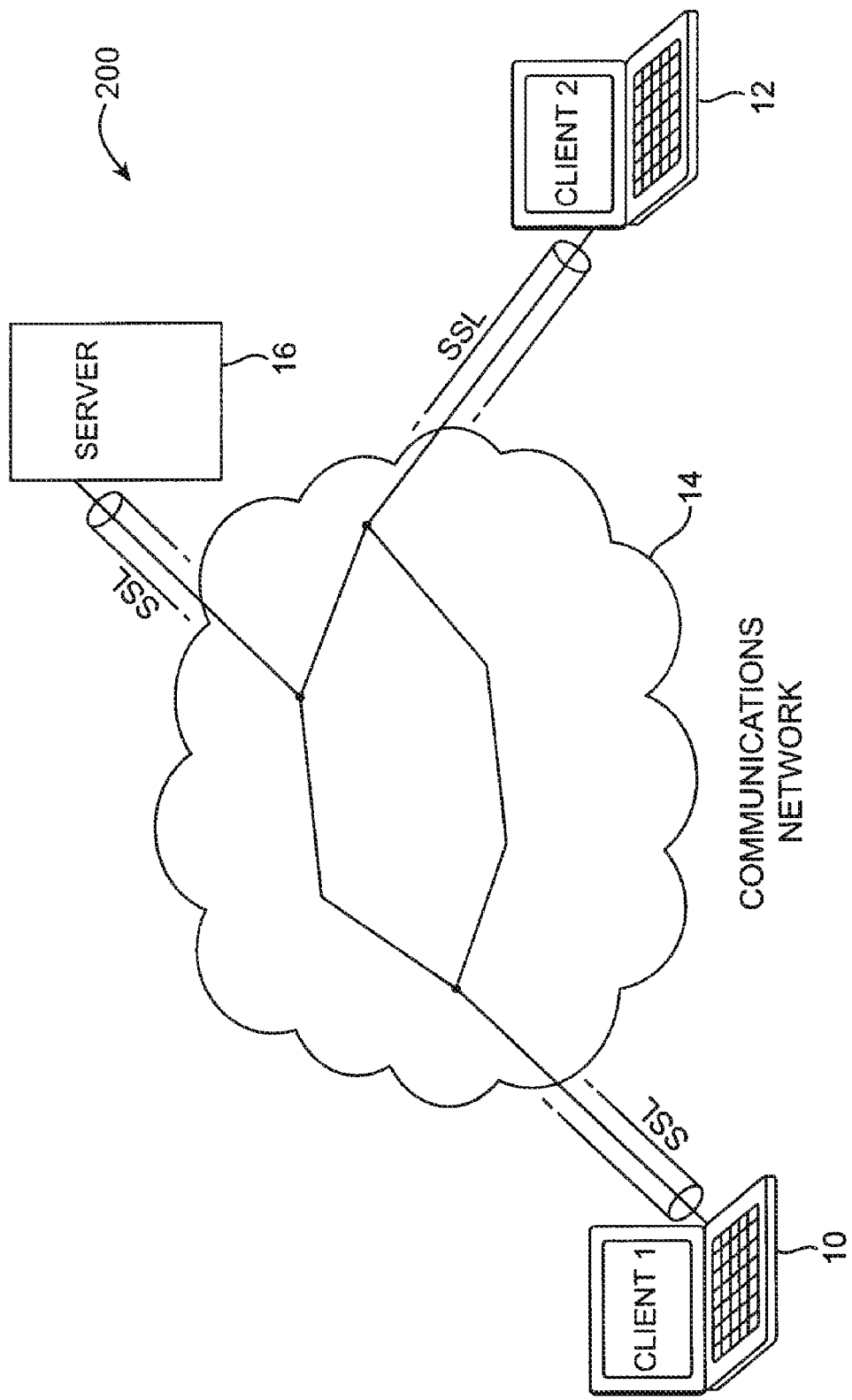
FIG. 2 is a diagram schematically illustrating a system for securely transmitting data between clients over a communications network in accordance with one embodiment of the present invention.

FIG. 2 schematically illustrates a system 200 for securely transmitting data between clients 10 and 12 over a communications network 14 in accordance with one embodiment of the present invention. The system includes an intermediate server 16 coupled with the communications network 14. Although only two clients are show in FIG. 2, more than two clients may be included in the system 200. This is a closed system and all users (and clients) should be registered before joining the system. All registered users/clients are known to the server 16 which intermediates data exchange between the clients. The data transmission is protected by employing an encryption scheme, for example, the SSL protocol. Other encryption scheme(s) may be used, in addition to or in place of the SSL protocol. A user can select a user or a group of users as recipient(s) of the data to be transmitted.

Figure 3:
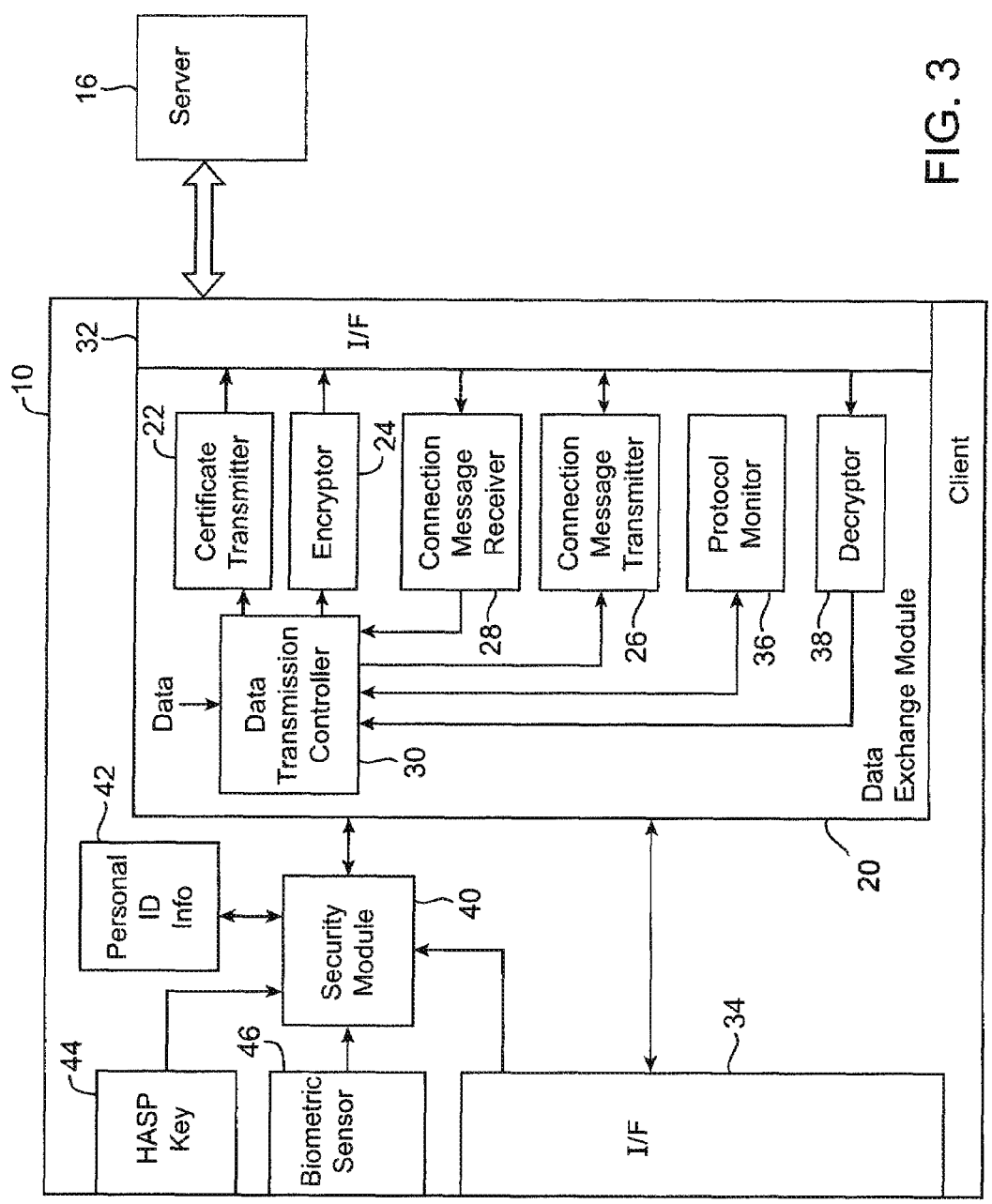
FIG. 3 is a block diagram schematically illustrating the client including a data exchange module in accordance with one embodiment of the present invention.

Each client includes a data exchange module capable of communicating with the server 16. FIG. 3 schematically illustrates the client 10 including a data exchange module 20 in accordance with one embodiment of the present invention. For example, the data exchange module 20 may be an application program installed on the client computer. In accordance with one embodiment of the present invention, the application program has one-to-one correspondence with the client 10 on which it is installed, and identified by a unique module identification information, for example, a serial number. An electronic certificate for the client 10 (a client certificate) is assigned when the application program is installed on the client 10, for example, by the maker of the application program. The electronic certificate may be updated, changed, or renewed yearly or every two years, and the like. The client certificate is specifically assigned to a particular client to identify the client.

As shown in FIG. 3, the data exchange module 20 includes a certificate transmitter 22, a data encryptor 24, a connection message transmitter 26, a connection message receiver 28, a data transmission controller 30, and an interface 32. The data exchange module 20 also includes a decryptor 38 which decrypt data received from the server 16. The client 10 also includes other components such as data processing module (not shown) to process the data.

The certificate transmitter 22 is adapted to send the client certificate to the server 16 via the interface 32. A server certificate is returned from the server 16 to the client 10 if the client 10 is authenticated. The client 10 attaches the server certificate to data to be transmitted, and the data encryptor 24 encrypts the data and the server certificate together to generate encrypted data. For example, the secure socket layer (SSL) protocol is used for the encryption.

The connection message transmitter 26 sends a series of client connection messages to the server 16 at least while the encrypted data is being transmitted. In accordance with one embodiment of the present invention, the client 10 starts sending the connection messages from the time when the client 10 logs on to the server 16 and stops sending the client connection messages when the client 10 logs off from the server 16. The series of client connection messages have a sequence, order, or pattern specific to the client 10. For example, each of the client connection messages may be numbered, time stamped, or otherwise identifiable or distinguishable each other such that series of them forms a particular sequence determinable by the receiver/observer. Alternatively, the client connection messages may include several types, and a sequence of the types constitute a pattern. For example, if the connection messages have four types A, B, C, D, a sequence of ABCDABCDABCD . . . constitute a specific periodic pattern. The client connection messages are client-specific, or include a client-identifier, and thus the server can distinguish which client sends the specific client connection messages. In addition, each client has a different pattern of the client connection messages. Furthermore, the specific sequence, order, or pattern may be updated or changed once for a desired time period.

The connection message receiver 28 receives and monitors server connection messages sent from the server 16. Similarly to the client connection messages, the series of server connection messages have a specific sequence, order, or pattern. During the data transmission, the connection message receiver 28 monitors and checks the sequence of the received server messages. If the order (or specific pattern) is disturbed, for example, missing server message(s) or switching the order thereof, it means some hacking of the data, misdirection, interception, or other attack on the data transmission.

The data transmission controller 30 controls the certificate transmitter 22, the encryptor 24, the connection message transmitter 26, and the connection message receiver 28. If the connection message receiver 28 detects a disturbance in the received server connection messages, the data transmission controller 30 stops the ongoing data transmission. If the data transmission is terminated before completion, the data transmission controller 30 starts over client authentication processes such that the certificate transmitter 22 re-sends the client certificate to the server 16.

In accordance with one embodiment of the present invention, the client 10 also includes a security module 40 and a memory or database 42. User identification information such as a username, a password, biometric information, and other personal information such as date of birth, place of berth, etc. may be stored in the memory 42. A hardware-based security key 44, such as a Hardware Against Software Piracy (HASP®) key, available from Aladdin Knowledge Systems, Ltd., Arlington Heights, Ill., may also be installed, for example, when the application program is installed. The HASP® key is used for protecting and licensing software running on stand-alone computers. Other types of hardware-based keys, passwords, or passcodes may also be used.

The security module 40 authorizes a user to use the client 10 based on the user identification information. The security module 40 identifies and authenticates the user using any combination of the above mentioned identification/personal information. The user may be prompted to enter one or more types of the personal identification via a user interface 34. The attempted user may also be required to insert the correct hardware-based security key before using the client computer to transmit data. Alternatively, in accordance with the circumstances under which the client 10 is used, a plurality of users may be allowed to use the client 10 for data transmission by sharing the correct hardware-based security key. In the case where the user's biometric information is used, the client 10 may also be provided with a biometric sensor 46, for example, a fingerprint sensor or an image capturing device to receive the biometric information from the attempted user. The security module 40 includes software and/or circuitry (not shown) necessary to perform such biometric identification processes as is well understood by those of ordinary skill in the art. All of the identification/personal information mentioned above may be stored at the time when the data exchange module is installed and initialized for a specific client and user. It should be noted that although the security module 40 is illustrated separately from the data exchange module 20 in FIG. 3, the security module 40 may be integrated into, or part of the data exchange module 20.

If the user is successfully identified and authenticated, the user is authorized to use the client 10 for data transmission. In response to the user's request or command, the client 10 may first send an access request with the client certificate to the server 16. The server 16 confirms that the requesting client 10 has the correct client certificate, and then sends back its server certificate to the client 10. Alternatively, the server 16 may only return an approval (positive authentication result) to the client 10 so as to continue the process (allowing the client 10 to log-on to the system), and may wait sending the server certificate until the client 10 further makes a data transmission request. If the client 10 makes a data retrieval request, the server 16 does not have to return the server certificate. In addition, the data exchange module's identification information (for example, the serial number) and/or that of the client machine may also be used in an additional authentication process for the client 10. Which information is used in what order may be in accordance with a selected authentication protocols between the client 10 and the server 16, and such a specific sequence of the processes may also used to provide an additional security measure.

Thus, the data exchange module 20 may further include a protocol monitor 36 controlled by the data transmission controller 30. The protocol monitor 36 monitors an operation sequence of the data exchange module 20 for any deviation from predetermined specific protocols. If the timing or operation sequence deviates from the specific protocols, it may indicate the process is being attacked or hacked, or some disguised client/user is attempting to access to the server 16. In such a case, the certification process and/or the subsequent data transmission is halted by the data transmission controller 30, and the entire process is started over. This provides an additionally layer of security.

In accordance with one embodiment of the present invention, the server 16 is not necessarily an intermediate server, but may be a commercial server providing on-line shopping, on-line banking, or other electronic transactions. In such a case, the client 10 may be a customer-client. Such a customer-client may download an application program for the data exchange module from the commercial server, or purchase a recording medium (such as an optical compact disc) storing the application program thereon for an off-line installation. The client connection messages and the server connection messages can be exchanged between the customer-client and the server during the electronic transaction, or as long as the customer-client is logged on to the server. The client/server connection messages provide continuous confirmation of the right customer/server entity during the electronic transaction, as well as protection from unauthorized interference with the communication path. The electronic certificate may be sent separately to the customer-client. The above-mentioned certificate exchange may be performed in the initial authentication process for the customer-client, and the server certificate may be attached when the customer-client makes a payment or transfers a fund, or when any critical/sensitive information is transmitted from the customer-client to the server.

Figure 4:
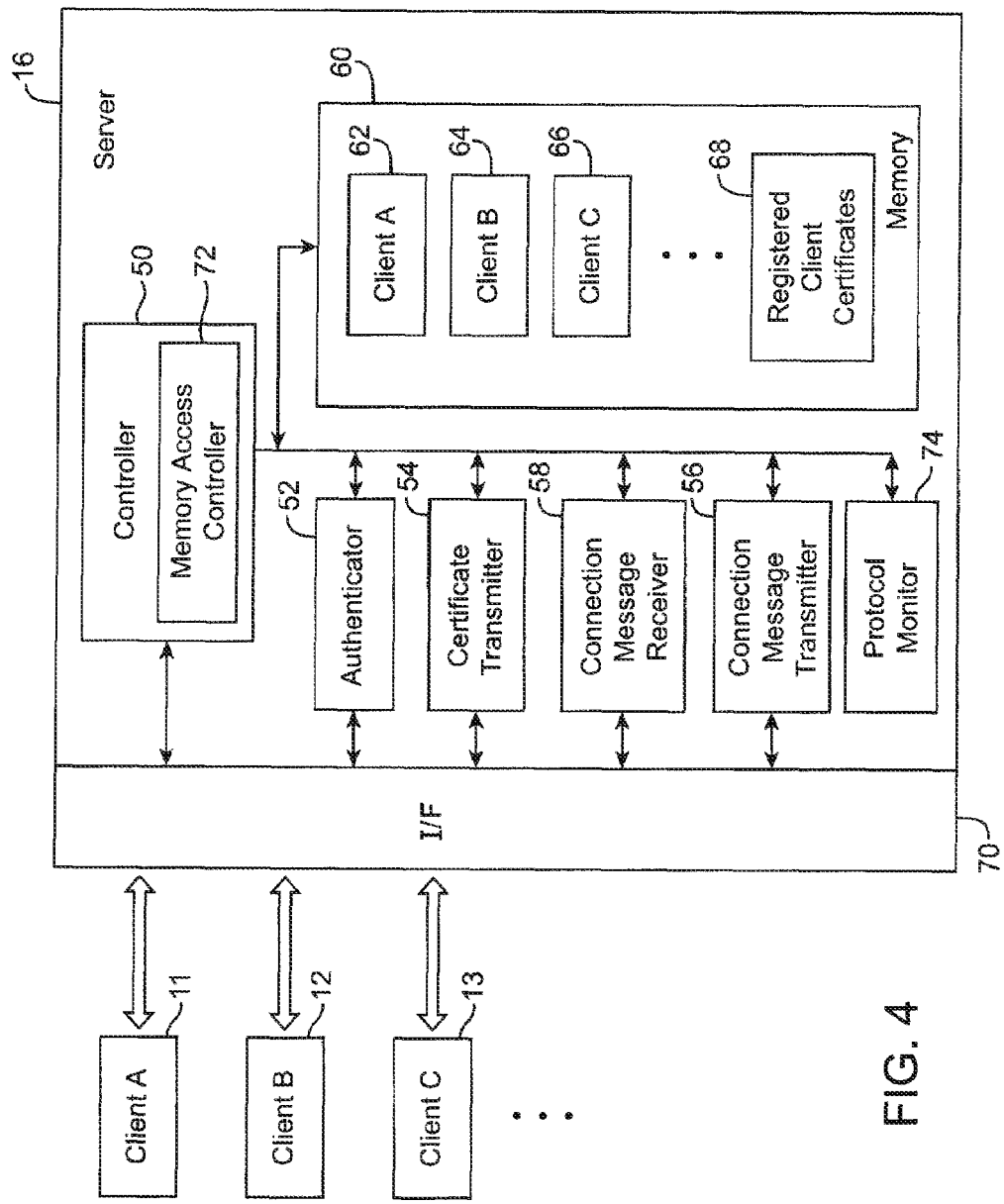
FIG. 4 is a block diagram schematically illustrating the server in accordance with one embodiment of the present invention.

FIG. 4 schematically illustrates the server 16 in accordance with one embodiment of the present invention. The server 16 includes a controller 50, an authenticator 52, a certificate transmitter 54, a connection message transmitter 56, a connection message receiver 58, a memory 60, and an interface 70. The authenticator 52 receives a client certificate sent from the client 10, and authenticates the client 10 based on its client certificate. For example, the authenticator 52 determines if the client certificate from the client 10 matches one of registered client certificates. The memory 60 may include a database 68 maintaining the registered client information or the registered client certificates for use by the authenticator 52. Other information such as a username and password may also be used for authenticating the client 10 in addition to the client certificate.

The certificate transmitter 54 generates, if the client 10 is authenticated, a server certificate based on, or as a function of, the client certificate, and transmits the server certificate to the client 10. The server certificate includes information of the client certificate. For example, the client certificate may be piggybacked or appended to the server certificate.

Similar to the client's connection message transmitter 26, the server's connection message transmitter 56 sends a series of server connection messages to the client 10. The server connection messages are transmitted at least while the data is being transmitted between the server 16 and the client 10. In accordance with one embodiment of the present invention, the server 16 starts sending the server connection messages from the time when the client 10 logs on to the server 16 and stops sending the client connection messages when the client 10 logs off from the server 16. The server connection messages are not broadcasted, but transmitted only to the client 10 which is currently logs onto the server 16. Similarly to the client connection messages, the server connection messages have a specific sequence, order, or pattern to be monitored by the client 10.

The connection message receiver 58 receives and monitors the client connection messages sent from the client 10, and the controller 50 terminates data transmission if the connection message receiver 58 finds a disturbance in the sequence, order or pattern of the client connection messages. If the data transmission is terminated or halted before completion due to the disturbance in the received client messages, the controller 50 may send an error message through the interface 70 to the client 10. In response to such an error message, the client 10 initiates re-authentication process by sending the client certificate so as to re-transmits the data. If the data transmission is successfully completed, the transmitted data (uploaded data) is stored in the memory 60 of the server 16, typically for a predetermined time period.

The memory 60 includes databases 62, 64, 66, . . . , each of which is associated with a specific client. In accordance with one embodiment of the present invention, a user of the client 10 can select which user(s) the data to be sent to (i.e., recipient clients), and how long the stored data to be maintained in the server 16. These selected information may be specified in the data transmission request. If no specific time duration is selected, the controller 60 may set a default time value. Thus, the data uploaded to the server 60 is stored in the corresponding database for the recipient client for a selected time period, during which the recipient client is able to access and retrieve (download) the data.

For example, when the client 10 (sender-client A) transmits data to the server 16, the data transmission request includes at least one recipient client, for example, the client 12 (recipient-client B), and the data transmitted from client 10 is stored in the database 64 associated with the client 12 (recipient client B). The stored data is remain encrypted and includes the server certificate containing the client certificate information. Thus, when the client 12 retrieves and decrypts the data, the client 12 is able to confirm the client 10 is the sender-client A.

The controller 50 may include a memory access controller 72 coupled with the authenticator 52 and the memory 60 to perform the above-described memory operation. That is, the memory access controller 72 receives a data transmission request from the client 10 (sender-client A), and stores the encrypted data from the client 10 in the database 64 associated with client 12 (recipient-client B), which is specified in the data transmission request. When the client 12 requests access to the associated database 64 and data retrieval therefrom, the access controller 72 allows the stored data to be transmitted to the client 12 after the client 12 is authenticated by the authenticator 52. The authenticator 52 authenticates the client 12 in the same manner as it authenticates the client 10.

Furthermore, the server 16 may include a protocol monitor 74 controlled by the controller 50. The protocol monitor 74 monitors an operation sequence of the server 16 for any deviation from predetermined specific protocols. If the timing or operation sequence deviates from the specific protocols, it may indicate the process is being attacked or hacked, or some disguised client/user is attempting to access to the server 16. In such a case, the certification process and/or the subsequent data transmission is halted by the controller 50, and the entire process is started over. This provides an additionally layer of security.

In accordance with one embodiment of the present invention, the server 16 may be a commercial server and not an intermediate server as described above. In such a case, each of the databases 62, 64, etc. may be a client's account records maintaining a respective client's financial information, purchase information, or associated personal information. The controller 50 or the memory access controller 72 may control each client's access to its own account records, rather than maintaining the data for a specific time period. The authenticator 52, the certificate transmitter 54, the connection message transmitter 56, the connection message receiver 58, and the protocol monitor 74 may be implemented in the commercial server in a similar manner as the intermediate server.

Figure 5:
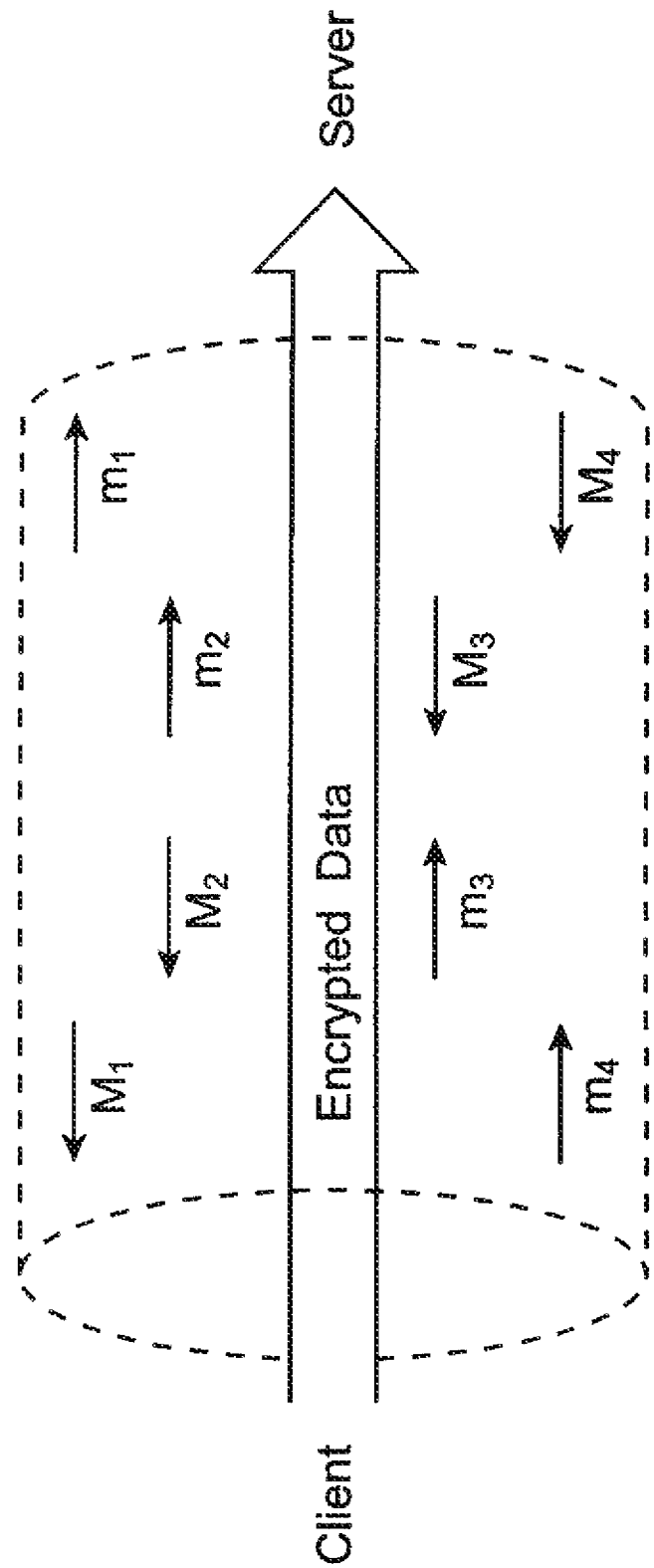
FIG. 5 is a diagram conceptually illustrating the communication path protection by a bidirectional connection message flow in accordance with one embodiment of the present invention.

As described above, at least during the time when the data is transmitted between the server and the client, a series of client connection messages ($m_1, m_2, m_3, \ldots$) are sent to the server, and a series of server connection messages ($M_1, M_2, M_3, \ldots$) are sent to the client as background communications between the server and the client as shown in FIG. 5. Two or more series of connection messages may be employed in either direction for additional security. Each of the connection message may be a small data packet containing the source, destination, and sequence information as described above. Thus, as shown in FIG. 5, the encrypted data being transmitted are protected by a bidirectional flow of the client and server connection messages along the communication path. These client and server connection messages serve as a "guard" or "watchdog" for the data transmission path, and a disturbance in the connection message flow indicates an unauthorized interference with the data transmission path. The disturbance is detectable at either side (i.e., at the client and the server). The client and server connection messages also provide continuous confirmation of the identity of the client and the server, that is, the client is the right client, and the server is the right server throughout the data transmission or electronic transaction.

Figure 6:
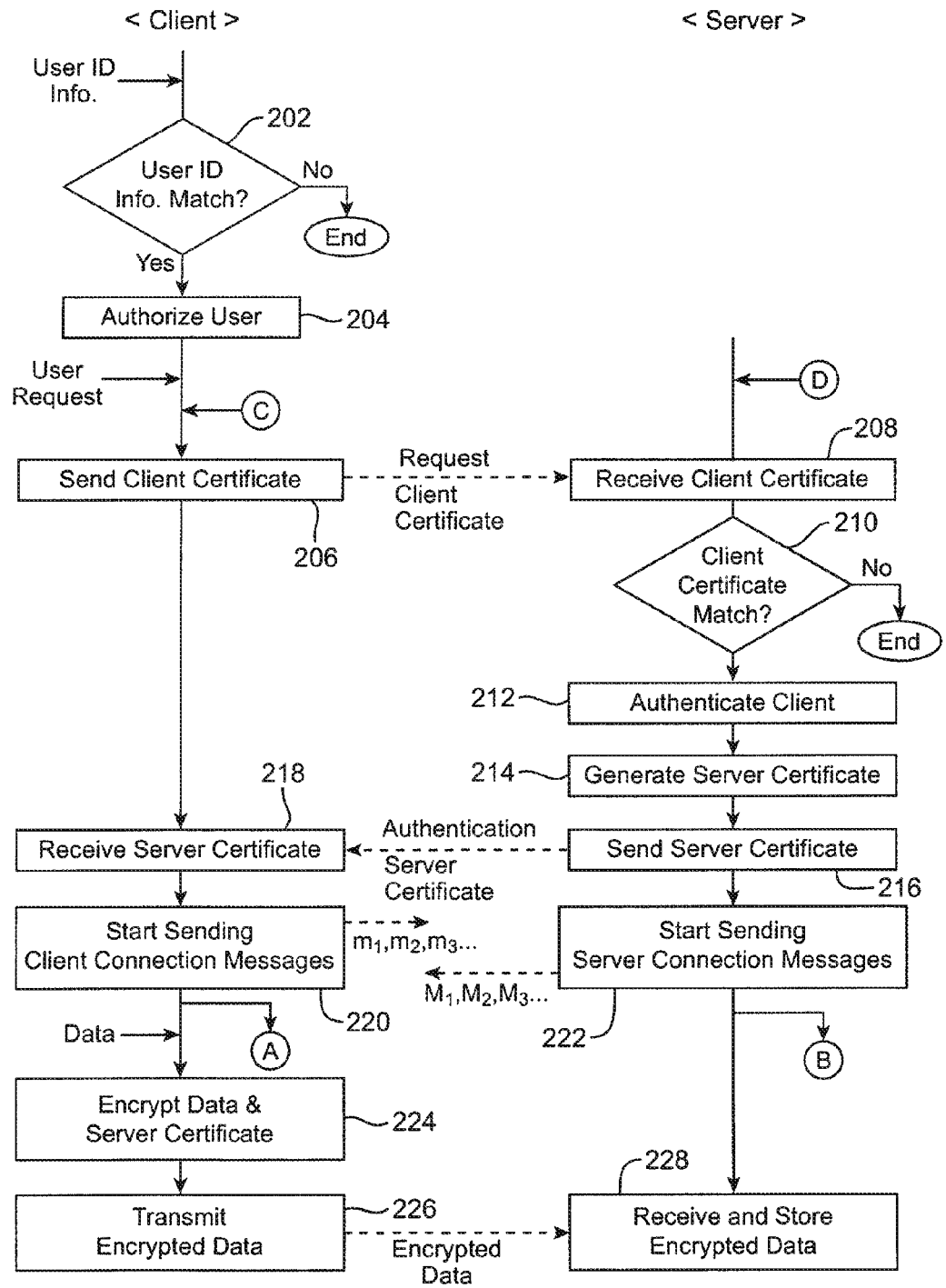
FIG. 6 is a process flow diagram schematically illustrating a method for securely transmitting data between a client and a server over a communications network, in accordance with one embodiment of the present invention.

FIG. 6 schematically illustrates a method for securely transmitting data between a client and a server over a communications network, in accordance with one embodiment of the present invention. The client includes a data exchange module capable of communicating with the server. The data exchange module is configured for a specific client, which is configured for a specific user to have the identification information of the user. For example, an application program is installed onto the client so as to configure the data exchange module, including assigning a client certificate, setting client/server connection message function, and other specific protocols. The client and server may be the client 11 and server 16 described in the above embodiments.

In accordance with one embodiment of the present invention, only the authorized user(s) have access to the data exchange/transmission system. First, a user attempting to transmit data using the client is prompted to enter the user identification (ID) information. The input ID information is compared with the stored ID information of the authorized user (202). For example, any combination of a username, a password, personal information, a hardware-based security key, biometric information of the user, and the like can be used to authenticate the user. If the required user ID information matches each other, the user is authorized (204) to use the data exchange/transmission system.

The user makes a request, for example, a data transmission request. In response to the user request, a client certificate and a data transmission (upload) request is sent to the server (206). The data transmission request specifies at least one recipient client/user. The server receives the client certificate (208), and determines if the client certificate matches one of registered client certificates (210). The server authenticates the client (212) if the client certificate matches, and generates a server certificate (214) based on the client certificate. The server transmits the server certificate to the client (216). The server certificate includes information of the client certificate. In authenticating the client, other client identification such as a password or serial number may also be used for additional security. The client receives the server certificate (218). By exchanging the respective certificates between the client and the server, the client is authenticated, and also the client can confirm the identity of the server from the server certificate.

Once the client is authenticated, the client is typically logged on to the server. After that, the client and the server may start sending their respective connection messages (220, 222). A series of client connection messages are transmitted from the client to the server, and a series of server connection messages are transmitted from the server to the client, at least while the encrypted data is being transmitted. The client and server may stop transmitting their connection messages when the client logs off from the server.

When transmitting the data, the client attaches the received server certificate to the data to be transmitted, and encrypted them together (224). For example, the SSL protocols are be used for encryption. The encrypted data (including the server certificate) is sent to the server (226). The server receives and stores the encrypted data in a database associated with a recipient (228). If the data transmission request from the client specifies more than one recipient, the transmitted data is stored in each database corresponding to the respective recipient.

Figure 7:
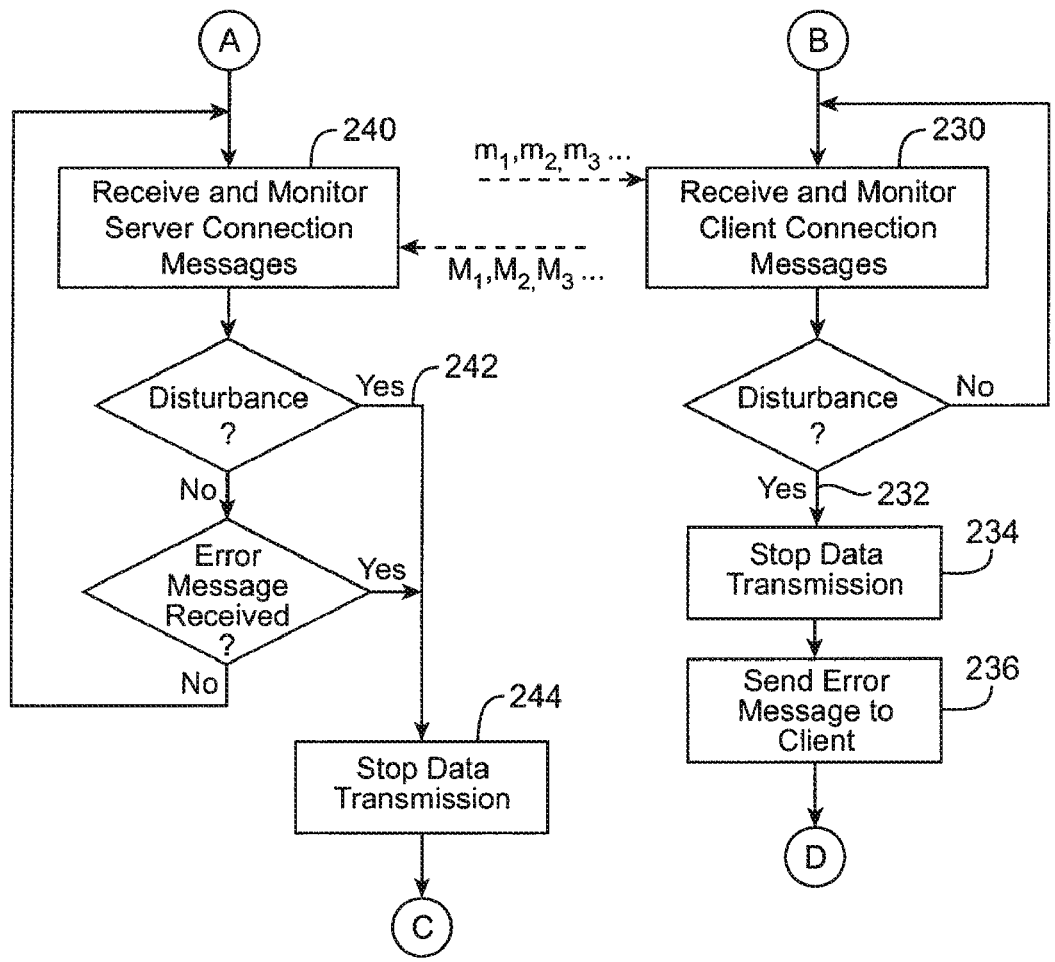
FIG. 7 is a process flow diagram schematically illustrating a mechanism of protecting the data transmission path using the connection messages in accordance with one embodiment of the present invention.

FIG. 7 schematically illustrates the mechanism of protecting the data transmission path using the connection messages in accordance with one embodiment of the present invention.

After the client logs on to the server, the client and the server may start sending their respective connection messages (220, 222 in FIG. 6) to each other, and continue sending them until the client logs off from the server. The transmission of the connection messages is performed in parallel with the "main" data transmission between the client and the server, and the connection messages are exchanged between the client and server to "cover" at least the time period from the start of the data transmission until the completion thereof. As described above, the series of client connection messages have a client-specific sequence or pattern, and the series of server connection messages have a specific sequence or pattern.

As shown in FIG. 7, the client connection messages are received and monitored at the server (230), and if a disturbance is found in the client connection messages (232), the server stops the on-going data transmission (234). For example, such a disturbance includes missing connection message(s), switched order, unexpected delay, and the like. When disturbance is observed or the data transmission is stopped before its completion, the server may send an error message to the client (236). In response to he error message, the client (the data exchange module therein) stops transmitting the data and starts over the client authentication process.

Similarly, the client receives and monitors the server connection messages (240), and if a disturbance is found in the server connection messages (242), the client terminates the on-going data transmission (244). When the data transmission is halted, the client's process returns to the client authentication process (206, FIG. 6), and the client certificate is re-transmitted to the server. After the client/server certificates are successfully exchanged, the client re-transmitted the data to the server.

The termination (discontinuation) of the data transmission, re-authentication of the client, and re-transmission of the data may be automatically performed by the data exchange module of the client and the server without any user intervention. Thus, the system ensures the safe and secure data transmission even if the user is unaware of the "retry" processes. In the case where the client/server connection messages are repeatedly disturbed, and the data transmission cannot be completed after a predetermined number of retry, the data exchange module may issue a warning message to the user.

It should be noted that in the above-described examples, the client is authenticated in the certificate exchange process. However, in accordance with one embodiment of the present invention, an initial authentication process may be provided before exchanging the client and server certificates. For example, the client may send the username and password to log on to the server, and then exchange certificates before transmitting data. Sending the client/server connection messages may be started before exchanging the certificates, or after exchanging the certificates before the data transmission. A specific procedure and timing of the authentication, certificate exchange, and correction message transmission can be set as a client-specific protocol, and can be used to detect any external interference with the client-server communication by monitoring the operation sequence of processes. If a deviation from the specific protocol is found in the operation sequence, the client and/or the server may terminate the process, re-authenticate the client, and re-transmit the encrypted data from the client to the server.

Figure 8:
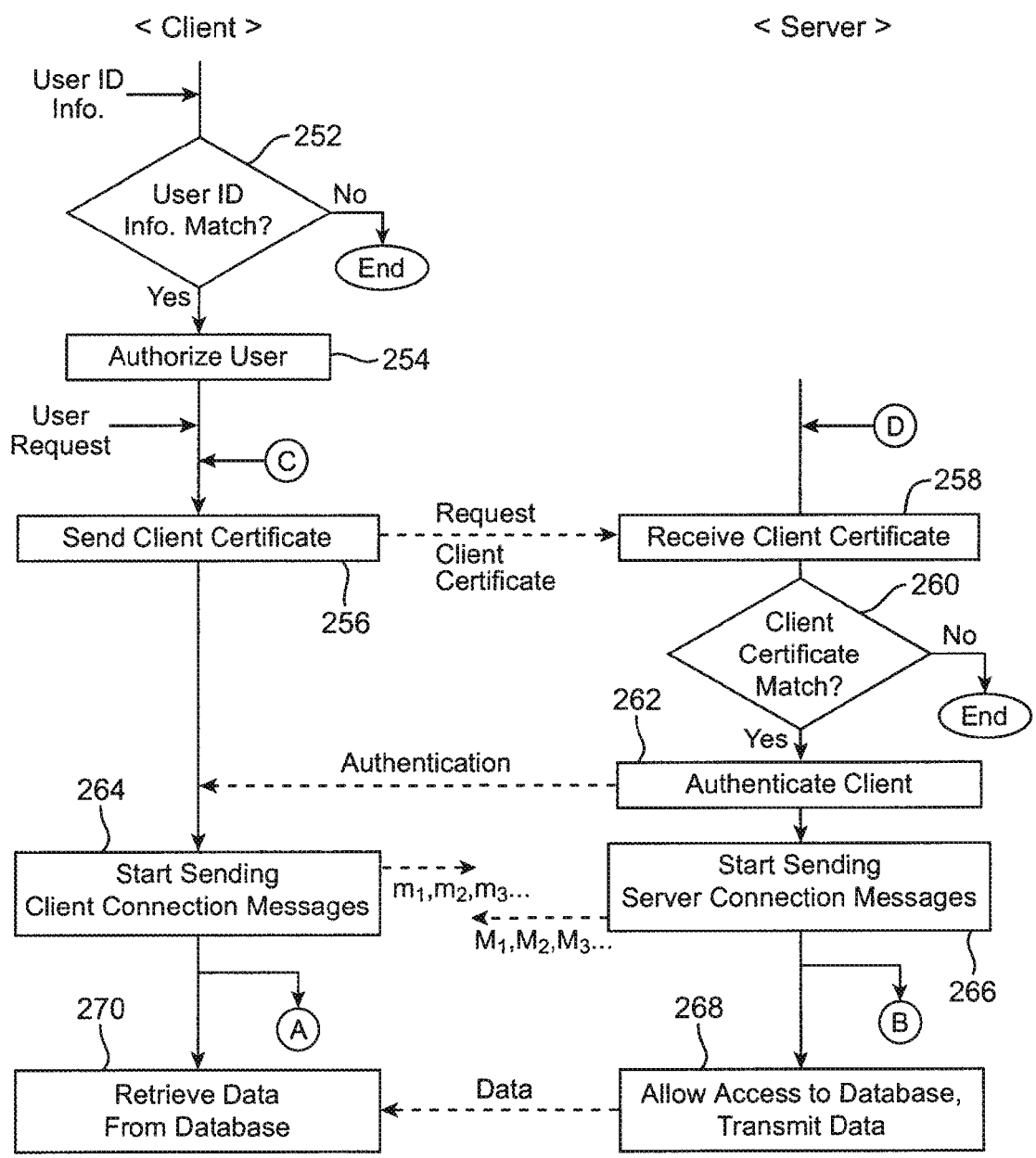
FIG. 8 is a process flow diagram schematically illustrating a data retrieval by a recipient-client form the server in accordance with one embodiment of the present invention.

FIG. 8 schematically illustrates a data retrieval process by a recipient (another client) in accordance with one embodiment of the present invention. When a user of the recipient attempts to retrieve the data from the server, the user may be authorized (252, 254) in the same manner as described above (202, 204 in FIG. 6).

The user makes a data retrieval request, in response to which a data retrieval (download) request and a client certificate are sent to the server (256). The server receives the client certificate (258), and determines if the client certificate matches one of registered client certificates (260). The server authenticate the client (262) if the client certificate matches, and allow the client to log on to the server. Optionally, the server may generate a server certificate based on the client certificate and transmits the server certificate to the client (not shown in FIG. 8). Since in a data retrieval transaction the recipient-client does not transmit data to the server, it is not necessary to return the server certificate to the client. However, the server certificate may be used to confirm the server identity at the client.

In addition, if the recipient-client further wants to transmit data after it retrieves the stored data before logging off, the client may send another request for data transmission to the server in the same session. In such a case, the client certificate may be re-sent with the data transmission request and the sever may generate and return the server certificate in response to receiving the client certificate, in the same manner as described above. Alternatively, the server may store the client certificate initially received form the client during the session. However, in accordance with one embodiment of the present invention, the client (the data exchange module therein) may automatically (without user intervention) attach the client certificate every time the client makes a new request to the server during the same session, such that the server has additional opportunity to confirm the client identity (in addition to receiving the client connection messages).

Once the client is authenticated, or the client is logged on to the server, the client and the server start sending their respective connection messages (264, 266). The client is allowed access to the database associated with itself (268), and the encrypted data (including the server certificate) stored therein is transmitted from the server to the client (270). The recipient-client decrypt the retrieved data. From the server certificate which includes the sender-client information, the recipient may confirm the sender. The monitoring of the client/server connection messages and re-authentication/re-transmission, if any, are performed in the same manner as that described in FIG. 7.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. A client computer for securely transmitting data to and from a server over a communications network, said client computer comprising:
   a microprocessor coupled to a memory,
   wherein the microprocessor is programmed to form a data exchange module including:
      a certificate transmitter for sending a client certificate to the server;
      a connection message receiver for receiving and monitoring a series of server connection messages continually sent from the server while the data is being transmitted, the series of server connection messages forming a separate flow independent of a flow of the data being transmitted, the separate flow of the series of server connection messages being received in parallel with the flow of the data being transmitted;
      and a data transmission controller coupled to said connection message receiver, said data transmission controller terminates data transmission if a disturbance is found in the series of server connection messages being received, said certificate transmitter re-sending the client certificate to the server if the data transmission is terminated before completion;
   wherein said microprocessor is further programmed to form:
      a data encryptor for encrypting data and a server certificate to generate encrypted data for transmission, the sever certificate being received from the server; and
      a connection message transmitter for continually sending a series of client connection messages to the server at least while the encrypted data is being transmitted, the series of client connection messages forming a separate flow independent of the flow of the data being transmitted, and being sent in parallel with the data being transmitted.

2. The client computer of claim 1, wherein the series of client connection messages have a client-specific sequence or pattern.

3. The client computer of claim 1, wherein said microprocessor is further programmed to form:
   a security module for authorizing a user to use the client for data transmission based on user identification information.

4. The client computer of claim 3, wherein said security module authenticates the user using at least one of:
   a username;
   a password;
   personal information of the user;
   a hardware-based security key; and
   biometric information of the user.

5. The client computer of claim 4, wherein said memory includes a database adapted to store at least one of:
   a username;
   a password;
   personal information of the user; and
   biometric information of the user.

6. The client computer of claim 1, wherein said microprocessor is further programmed to form:
   a protocol monitor for monitoring, through said data transmission controller, an operation sequence of said data exchange module for any deviation from a predetermined specific protocol, said protocol monitor terminates data transmission if a deviation from the specific protocol is found.

7. A server for securely transmitting data to and from clients over a communications network, said server comprising:
   a memory for storing data transmitted from clients, said memory including databases each associated with a specific client;
   an authenticator for receiving a client certificate sent from a client, said authenticator authenticating the client based on the client certificate;
   a certificate transmitter for generating a server certificate based on the client certificate and sending the server certificate to the client, the server certificate including information of the client certificate;
   a connection message transmitter for continually sending a series of server connection messages to the client in while the data is being transmitted between the server and the client, the series of server connection messages forming a separate flow independent of the flow of the data being transmitted, and the separate flow of the series of server connection messages being sent in parallel with the flow of data being transmitted;

a connection message receiver for receiving and monitoring a series of client connection messages from the client, the series of client connection messages forming a separate flow independent of the flow of data being transmitted, and the separate flow of the series of client connection messages being received in parallel with independently and separately from the flow of the data being transmitted; and a controller for terminating data transmission if a disturbance is found in the series of the client connection messages being received is found;

wherein said controller comprises:

a memory access controller coupled with said authenticator and said memory, said memory access controller allowing encrypted data received from a sender-client to be stored in a database associated with a recipient-client which is specified by a data transmission request from the sender-client, and allowing the stored encrypted data to be transmitted to the recipient-client if the recipient-client is authenticated and requesting a data retrieval.

8. The server of claim 7, wherein said authenticator determines if the client certificate matches one of registered client certificates.

9. The server of claim 7, wherein said memory access controller maintains the stored data for a limited time period if the data transmission request specifies the limited time period.

10. A system for securely transmitting data between clients over a communications network, said system comprising:

a server coupled with the communications network; and an apparatus implemented in each client, said apparatus including a data exchange module capable of communicating with said sewer, wherein said data exchange module comprising:

a certificate transmitter for sending a client certificate to said server, the client certificate being uniquely assigned to the client;

a data encryptor for encrypting data and a server certificate to generate encrypted data for transmission, the server certificate being received from said server;

a connection message transmitter for continually sending a series of client connection messages to said server while the encrypted data is being transmitted, the series of client connection messages forming a separate flow independent of the flow of the encrypted data being transmitted, and the separate flow of the series of the client connection messages being sent in parallel with the flow of the encrypted data being transmitted;

a connection message receiver for receiving and monitoring a series of server connection messages sent from the server, the series of server connection messages forming a separate flow independent of the flow of data being transmitted, and the separate flow of the series of server connection messages being received in parallel with the data being transmitted; and a data transmission controller coupled to said connection message receiver, said data transmission controller terminating data transmission if a disturbance is found in the series of server connection messages being received, said certificate transmitter re-sending the client certificate to said server if the data transmission is terminated before completion, and wherein said server comprising:

a memory for storing data transmitted from the clients, said memory including databases each associated with a specific client;

an authenticator for receiving a client certificate sent from a client, and for authenticating the client based on the client certificate;

a certificate transmitter for generating a server certificate based on the client certificate and sending the server certificate to the client, the server certificate including information of the client certificate;

a connection message transmitter for continually sending a series of server connection messages to the client at least while the data is being transmitted between the server and the client, the series of server connection messages forming a separate flow independent of the flow of data being transmitted, and the separate flow of the series of server connection messages being sent in parallel with the flow of the data being transmitted;

a connection message receiver for receiving and monitoring a series of client connection messages from the client, the series of client connection messages forming a separate flow independent of the flow of data being transmitted, and the separate flow of the series of client connection messages being received in parallel with the flow of the data being transmitted; and a controller for terminating data transmission if a disturbance is found in the series of client connection messages being received is found.

11. The system of claim 10, wherein said apparatus further comprises:

a security module for authorizing a user to use the client for data transmission based on user identification information.

12. The system of claim 10, wherein said server further comprises:

a memory access controller coupled with said authenticator and said memory, said memory access controller allowing encrypted data received from a sender-client to be stored in a database associated with a recipient-client which is specified by a data transmission request sent from the sender-client, and allowing the stored encrypted data to be transmitted to the recipient-client if the recipient-client is authenticated and requesting a data retrieval.

13. A method for securely transmitting data between a client computer ("client") and server over a communications network, performed by the client, the client including a microprocessor coupled to a memory, said method comprising:

sending, in response to a user request, a data transmission request and a client certificate to the server using the microprocessor, the client certificate being specifically assigned to the client, the data transmission request specifying at least one recipient client;

receiving a server certificate from the server;

encrypting data to be transmitted together with the server certificate using the microprocessor;

transmitting the encrypted data to the server;

transmitting, using the microprocessor, after the client is authenticated, a series of client connection messages from the client to the server continually at least while data is being transmitted, the series of client connection messages forming a separate flow independent of a flow of the data, and the separate flow of the series of client connection messages being transmitted in parallel with the flow of data;

receiving a series of server connection messages continually sent from the server after the client is authenticated while the client is transmitting data using the microprocessor, the series of server connection messages forming a separate flow independent of a flow of the data being transmitted, and the separate flow of the series of server connection messages being received in parallel with the flow of the data being transmitted, monitoring, using the microprocessor the series of server connection messages so as to determine if any disturbance is found in the series of server connection messages being received;

terminating, using the microprocessor, the data transmission between the client and the server if a disturbance is found in the series of server connection messages; and re-transmitting, using the microprocessor, the data from the client to the server after the client is re-authenticated, if the data transmission is terminated before completion thereof.

14. The method of claim 13, wherein the series of server connection messages have a specific sequence or pattern.

15. The method of claim 13, wherein the client starts sending the client connection messages from the time when the client logs on to the server, and stops sending, the client connection messages when the client logs off from the server.

16. The method of claim 13, wherein the series of client connection messages have a client-specific sequence or pattern.

17. The method of claim 13, further comprising:
authorizing a user to use the client for data transmission based on user identification information.

18. The method of claim 17, wherein said authorizing includes authenticating the user using at least one of:
a username;
a password;
personal information of the user;
a hardware-based security key; and
biometric information of the user.

19. The method of claim 13, further comprising:
monitoring, using the microprocessor, an operation sequence of processes between the client and the server so as to determine if there is any deviation from a specific protocol;
terminating the process if a deviation from the specific protocol is found in the operation sequence; and
re-transmitting the data after the client is re-authenticated, if the process is terminated due to the deviation.

20. A method for securely transmitting data between a client computer ("client") and a server over a communications network, performed by the server, the server including a microprocessor coupled to a memory, said method comprising:
receiving a series of client connection messages continually sent from the client after the client is authenticated while data is being transmitted, the series of client connection messages forming a separate from independent of a flow of the data, and the separate flow of the series of client connection messages being received in parallel with the flow of the data;
transmitting, using the microprocessor, after the client is authenticated, a series of sewer connection messages from the server to the client continually at least while the data is being transmitted, the series of server connection messages forming a separate flow independent of a flow of the data, and the separate flow of the series of sever connection messages being transmitted in parallel with the flow of data;
monitoring, using the microprocessor, the series of client connection messages so as to determine if any disturbance is found in the series of client connection messages being received; and
if a disturbance is found in the series of client connection messages, terminating the data transmission between the client and the server, re-authenticating the client, and re-transmitting the data from the sever to the client, using the microprocessor.

21. The method of claim 20, wherein the server starts receiving the client connection messages from the time when the client logs on to the server and stops receiving the client connection messages when the client logs off from the server.

22. The method of claim 20, wherein the series of client connection messages have a client-specific sequence or pattern.

23. The method of claim 20, wherein the server staffs sending the server connection messages from the time when the client logs on to the server and stops sending the server connection messages when the client logs off from the sewer.

24. The method of claim 20, wherein the sever connection messages has a specific sequence or pattern.

25. The method of claim 20, further comprising:
receiving a data transmission request and a client certificate from the client, the client certificate being specifically assigned to the client, the data transmission request specifying at least one recipient;
authenticating, using the microprocessor, the client using the client certificate;
generating, using the microprocessor, a server certificate based on the client certificate, the server certificate including information of the client certificate; and
transmitting the server certificate to the client.

26. The method of claim 25, further comprising:
receiving encrypted data from the client;
storing, using the microprocessor, the encrypted data in a database in a memory associated with the recipient.

27. The method of claim 25, wherein said authenticating includes:
determining if the client certificate matches one of registered client certificates.

28. The method of claim 20, further comprising:
authenticating the client using client identification information using the microprocessor.

29. The method of claim 20, further comprising:
monitoring, using the microprocessor, an operation sequence of processes between the client and the server so as to determine if there is any deviation from a specific protocol; and
terminating the process if a deviation from the specific protocol is found in the operation sequence; and
re-authenticating the client and re-transmitting the data using the microprocessor, if the process is terminated due to the deviation.

30. The method of claim 20, further comprising:
receiving a data retrieval request and a client certificate from a second client;
authenticating, using the microprocessor, the second client using the client certificate received from the second client; and
allowing the second client to retrieve data from a database associated with the second client if the second client is authenticated.

31. The method of claim 30, wherein said authenticating the second client includes:
  determining if the client certificate matches one of registered client certificates.

32. A method for securely transmitting data between client computers ("clients") via an intermediate server coupled with a communications network, said method comprising:
  sending, using a microprocessor in a client, in response to a user request, a data transmission request and a client certificate from the client to the sewer, the client certificate being specifically assigned to the client, the data transmission request specifying at least one recipient;
  authenticating, using a microprocessor in the server, the client using the client certificate; generating, using the microprocessor in the server, a server certificate based on the client certificate, the server certificate including information of the client certificate;
  transmitting, using the microprocessor in the server, the sever certificate from the sewer to the client;
  encrypting, at the client, data to be transmitted together with the server certificate, using the microprocessor in the client;
  transmitting the encrypted data from the client to the server;
  transmitting, after the client is authenticated using the microprocessor in the client, a series of client connection messages from the client to the server continually while the encrypted data is being transmitted, the series of client connection messages forming a separate flow independent of the flow of the encrypted data, and the separate flow of the series of client connection messages being transmitted in parallel with the flow of the encrypted data;
  transmitting, after the client is authenticated using the microprocessor in the sewer, a series of server connection messages from the server to the client continually while the encrypted data is being transmitted, the series of sever connection messages forming a separate flow independent of the flow of the encrypted data, and the separate flow of the series of server connection messages being transmitted in parallel with the flow of the encrypted data;
  monitoring the series of client connection messages using the microprocessor in the sewer, so as to determine if any disturbance is found in the series of client connection messages being received;
  monitoring the series of sever connection messages using the microprocessor in the client, so as to determine if any disturbance is found in the series of server connection messages being received;
  if a disturbance is found either in the series of client connection messages or the series of sever connection messages, terminating the data transmission between the client and the server, re-authenticating the client, and re-transmitting the data, using the microprocessor in the sever or in the client; and
  if the encrypted data is successfully transmitted to the server, storing the encrypted data in a database in a memory associated with the recipient.

33. The method of claim 32, further comprising:
  transmitting a data retrieval request and a client certificate from a second client to the server using a microprocessor in the second client;
  authenticating, using the microprocessor in the server, the second client using the client certificate received from the second client;
  allowing, using the microprocessor in at the server, the second client to retrieve data from a database associated with the second client if the second client is authenticated.

34. The method of claim 33, wherein said authenticating the second client includes:
  determining if the client certificate matches one of registered client certificates.

35. A program storage device readable by a machine, tangibly embodying a program of instructions executable by the machine to perform a method for securely transmitting data between a client and a server over a communications network, said method comprising:
  sending, in response to a user request, a data transmission request and a client certificate to the server, the client certificate being specifically assigned to the client, the data transmission request specifying at least one recipient client;
  receiving a server certificate from the server;
  encrypting data to be transmitted together with the server certificate; and transmitting the encrypted data to the server;
  transmitting, after the client is authenticated, a series of client connection messages from the client to the server continually at least while data is being transmitted the series of client connection messages forming a separate flow independent of a flow of the data and the separate flow of the series of client connection messages being transmitted in parallel with the flow of data;
  receiving, at the client, a series of server connection messages continually sent from the server after the client is authenticated while the data is being transmitted, the series of sever connection messages forming a separate flow independent of a the flow of the data, and the separate flow of the series of server connection messages being received in parallel with the flow of the data;
  monitoring the series of server connection messages so as to determine if any disturbance is found in the series of server connection messages being received;
  terminating the data transmission between the client and the server if a disturbance is found in the series of server connection messages; and
  re-transmitting the data from the client to the server after the client is re-authenticated, if the data transmission is terminated before completion thereof.

36. The program storage device of claim 35, wherein the series of server connection messages have a specific sequence or pattern.

37. The program storage device of claim 35, wherein the transmission of the client connection messages starts from the time when the client logs on to the server, and stops when the client logs off from the server.

38. The program storage device of claim 35, wherein the series of client connection messages have a client-specific sequence or pattern.

39. The program storage device of claim 35, wherein said method further comprises:
  authorizing a user to use the client for data transmission based on user identification information.

40. The program storage device of claim 39, wherein said authorizing includes authenticating the user using at least one of:
  a username;
  a password;
  personal information of the user;
  a hardware-based security key; and
  biometric information of the user.

41. The program storage device of claim 35, wherein said method further comprises:
- monitoring an operation sequence of processes between the client and the server;
- terminating the process if a deviation from a specific protocol is found in the operation sequence; and
- re-transmitting the data after the client is re-authenticated, if the process is terminated due to the deviation.

42. A program storage device readable by a machine, tangibly embodying a program of instructions executable by the machine to perform a method for securely transmitting data between a client and a server over a communications network, said method comprising:
- receiving, at the server, a series of client connection messages continually sent from the client after the client is authenticated while data is being transmitted, the series of client connection messages forming a separate flow independent of the flow of the data, and the separate flow of the series of client connection messages being received in parallel with the flow of the data being transmitted;
- transmitting, using the microprocessor, after the client is authenticated, a series of sewer connection messages from the server to the client continually at least while the data is being transmitted, the series of sever connection messages forming a separate flow independent of a flow of the data, and the separate flow of the series of sever connection messages being transmitted in parallel with the flow of data;
- monitoring the series of client connection messages at the server so as to determine if any disturbance is found in the series of client connection messages being received; and
- if a disturbance is found in the series of client connection messages, terminating the data transmission between the client and the server, re-authenticating the client, and re-transmitting the data.

43. The program storage device of claim 42, wherein said transmitting the series of server connection messages starts from the time when the client logs on to the server, and stops when the client logs off from the server.

44. The program storage device of claim 42, wherein the series of server connection messages has a specific sequence or pattern.

45. The program storage device of claim 42, wherein said method further comprises:
- receiving a data transmission request and a client certificate from the client, the client certificate being specifically assigned to the client, the data transmission request specifying at least one recipient;
- authenticating the client if the client certificate matches one of registered client certificates;
- generating a server certificate based on the client certificate, the server certificate including information of the client certificate; and
- transmitting the server certificate to the client.

46. The program storage device of claim 45, wherein said method further comprises:
- receiving encrypted data from the client;
- storing the encrypted data in a database associated with the recipient.

47. The program storage device of claim 45, wherein said authenticating includes:
- determining if the client certificate matches one of registered client certificates.

48. The program storage device of claim 42, wherein said method further comprises:
- receiving a data retrieval request and a client certificate from a second client;
- authenticating the second client using the client certificate received from the second client;
- allowing the second client to retrieve data from a database associated with the second client if the second client is authenticated.

49. The program storage device of claim 48, wherein said authenticating the second client includes:
- determining if the client certificate matches one of registered client certificates.

50. The program storage device of claim 42, wherein said receiving the series of client connection messages starts from the time when the client logs on to the server, and stops when the client logs off from the server.

51. The program storage device of claim 42, wherein the series of client connection messages have a client-specific sequence or pattern.

52. The program storage device of claim 42, wherein said method further comprises:
- authenticating the client using client identification information.

53. The program storage device of claim 42, wherein said method further comprises:
- monitoring an operation sequence of processes between the client and the server; and
- terminating the process if a deviation from a specific protocol is found in the operation sequence; and
- re-authenticating the client and re-transmitting the data, if the process is terminated due to the deviation.

* * * * *